United States Patent [19]

Eguchi et al.

[11] Patent Number: 5,481,528
[45] Date of Patent: Jan. 2, 1996

[54] INFORMATION PROCESSOR AND METHOD USING THE INFORMATION PROCESSOR

[75] Inventors: Ken Eguchi, Yokohama; Osamu Takamatsu, Atsugi; Etsuro Kishi, Sagamihara, all of Japan

[73] Assignee: Canon Kabushiki Kaisha, Tokyo, Japan

[21] Appl. No.: 124,002

[22] Filed: Sep. 21, 1993

[30] Foreign Application Priority Data

Sep. 25, 1992 [JP] Japan .................................. 4-279300
Jul. 27, 1993 [JP] Japan .................................. 5-203708

[51] Int. Cl.$^6$ .................................................. G11B 9/00
[52] U.S. Cl. .......................... 369/126; 369/100; 369/101; 365/118; 250/306; 250/310; 250/311
[58] Field of Search .............................. 369/126, 100, 369/101; 365/120, 118; 250/307, 306, 310, 311

[56] References Cited

U.S. PATENT DOCUMENTS

| | | | |
|---|---|---|---|
| 4,575,822 | 3/1986 | Quate | 365/174 |
| 5,020,881 | 6/1991 | Matsuda et al. | 350/331 |
| 5,066,883 | 11/1991 | Yoshioka et al. | 313/309 |
| 5,072,116 | 12/1991 | Kawade et al. | 369/126 |
| 5,075,738 | 12/1991 | Matsuda et al. | 357/6 |
| 5,136,212 | 8/1992 | Eguchi et al. | 315/150 |
| 5,140,398 | 8/1992 | Matsuda et al. | 357/30 |
| 5,170,238 | 12/1992 | Sakai et al. | 307/311 |
| 5,182,724 | 1/1993 | Yanagisawa et al. | 365/151 |
| 5,199,021 | 3/1993 | Hatanaka et al. | 369/126 |
| 5,222,060 | 6/1993 | Kuroda et al. | 369/126 |
| 5,241,527 | 8/1993 | Eguchi et al. | 369/126 |
| 5,255,258 | 10/1993 | Kawade et al. | 369/128 |
| 5,262,981 | 11/1993 | Rabe et al. | 365/120 |
| 5,270,965 | 12/1993 | Yanagisawa et al. | 365/107 |
| 5,274,475 | 12/1993 | Kawagishi et al. | 358/471 |
| 5,289,455 | 2/1994 | Kuroda et al. | 369/126 |
| 5,329,514 | 7/1994 | Eguchi et al. | 369/126 |
| 5,343,042 | 8/1994 | Fuchs et al. | 250/307 |
| 5,343,460 | 8/1994 | Miyazaki et al. | 369/126 |
| 5,359,204 | 10/1994 | Eguchi et al. | 257/2 |

FOREIGN PATENT DOCUMENTS

| | | |
|---|---|---|
| 61-80536 | 4/1986 | Japan . |
| 63-96956 | 4/1988 | Japan . |
| 63-161553 | 7/1988 | Japan . |
| 63-161552 | 7/1988 | Japan . |
| 1-245445 | 9/1989 | Japan . |

OTHER PUBLICATIONS

Takimoto, et al., "Switching and Memory Phenomena in Langmuir–Blodgett Films with Scanning Tunneling Microscope," Appl. Phys. Lett. vol. 61, No. 25, Dec. 1992, pp. 3032 through 3034.

Meyer, et al., "Novel Optical Approach to Atomic Force Microscopy," Appl. Phys. Lett., vol. 53, No. 12, Sep. 1988, pp. 1045 through 1047.

(List continued on next page.)

*Primary Examiner*—Viet Q. Nguyen
*Attorney, Agent, or Firm*—Fitzpatrick, Cella, Harper & Scinto

[57] ABSTRACT

An information processor for performing at least one of recording information at a high density, reproducing and erasing information by applying the principle of a scanning tunnel microscope (STM) or an atomic force microscope (AFM) and an information processing method using the information processor. The information processor is used with a recording medium comprising a recording layer having a characteristic of one of an insulator and a semiconductor. The processor includes a substrate electrode in the recording medium, at least one probe electrode disposed close to the recording medium, and at least one of a circuit for applying an information recording pulse voltage and a circuit for applying an information reproducing pulse voltage. A maximum difference in surface level of a 1×1 μm surface region of the substrate electrode is 1 nm or less, and the radius of curvature of a tip of the probe electrode is in the range of 0.1 to 200 μm. The processor further includes a device for controlling the distance between a surface of the recording medium and the tip of the probe electrode.

28 Claims, 7 Drawing Sheets

OTHER PUBLICATIONS

Mamin, et al., "Force Microscopy of Magnetization Patterns in Longitudinal Recording Media," Appl. Phys. Lett., vol. 53, No. 16, Oct. 1988, pp. 1563 through 1565.

Sakai, et al., "Switching and Memory Phenomena in Langmuir–Blodgett Films," Appl. Phys. Lett., vol. 53, No. 14, Oct. 1988, pp. 1274–1276.

Binning, et al., "Surface Studies by Scanning Tunneling Microscopy," Physical Review Letters, vol. 49, No. 1, Jul. 1982, pp. 57 through 60.

Petersen, "Silicon as a Mechanical Material," IEEE vol. 70, No. 5, May 1982, pp. 120 through 457.

Larkins, Jr., et al., "Langmuir–Blodgett Films As Barrier Layers In Josephson Tunnel Junctions," Thin Solid Films, vol. 99, 1983, pp. 277 through 282.

Batey, et al., "GaP/Phthalocyanine Langmuir–Blodgett Film Electroluminescent Diode," Electronics Letters, vol. 20, No. 12, Jul. 1984, pp. 489 through 491.

Thomas, et al., "GaAs/LB Film MISS Switching Device," Electronics Letters, vol. 20, No. 20, Sep. 1984, pp. 838 and 839.

INFORMATION PROCESSOR AND METHOD USING THE INFORMATION PROCESSOR

BACKGROUND OF THE INVENTION

1. Field of the Invention

This invention relates to an information processor for electrically recording/reproducing information based on an application of the principle of a scanning tunnel microscope (STM) or an atomic force microscope (AFM), and an information processing method using the information processor.

2. Description of the Related Art

Recently, with the development of an information-based society, many attempts have been made to develop large-capacity memories.

Such memories are variously designed by considering the desired performance and the intended use, and the following are general performance requirements for such memories:

(1) high recording density and large recording capacity;

(2) high recording/reproduction response speed;

(3) low power consumption; and (4) high productivity and low price. Presently, the development of memory systems or memory media satisfying these requirements is eagerly being promoted.

In the past, magnetic memories formed of magnetic materials and semiconductor memories formed of semiconductors have mainly been provided. Recently, with the development of laser technology, low-priced high-density recording media have been realized with optical memories using organic pigment, photopolymers or the like.

To further increase the density and capacity of this kind of memory, technology for forming finer unit memory bits is being promoted. In addition, memories based on principles entirely different from those of the above-mentioned conventional memories have been proposed. For example, molecular electronic devices have been conceptualized in which organic molecules function as logical elements and memory elements. Such molecular electronic devices can be regarded as devices having the unit memory bit size reduced to an utmost limit. However, such devices encounter the problem of establishing a method of accessing each molecule.

On the other hand, scanning tunnel microscopes (STMs) [see, e.g., G. Binning et al., Phys. Rev. Lett., 49, 57 (1982)] have recently been developed, which enable a real space image to be measured with a high resolution irrespective of monocrystalline and amorphous states.

For STMs, a phenomenon is utilized in which a tunnel current flows between a metallic probe (electrode) and a conductive material if the distance therebetween is reduced to about 1 nm while a voltage is applied therebetween. The current caused in this manner is very sensitive to the change in the distance between the probe and the conductive material. Therefore, it is possible to read various kinds of information relating to a whole electron cloud in real space by scanning the probe so that the tunnel current is constantly maintained. In this case, the resolution in a direction normal to the surface is about 0.1 nm.

Accordingly, it is substantially possible to perform recording and reproduction at a high density on an atomic order (on the order of sub-nanometers) by applying the principle of STMs. For example, in the case of an information processor disclosed in Japanese Patent Laid-Open Publication No. 61-80536, writing is performed by removing atom particles attracted to a medium surface. The removing is performed using an electron beam or the like, and written data is reproduced using an STM. Also, a recording method, such as that disclosed in U.S. Pat. No. 4,575,822, has been proposed in which recording is performed by injecting a charge into a dielectric layer formed on a recording medium surface. The charge is injected using a tunnel current flowing between the medium surface and a probe electrode, or by physically or magnetically collapsing a medium surface using laser light, an electron beam, a corpuscular beam or the like.

A method has also been proposed in which a thin layer of a material having a memory effect with respect to a switching characteristic of a voltage or current, e.g., a $\pi$ electron organic compound or a chalcogen compound, is used with an STM to perform recording and reproduction (see, e.g., Japanese Patent Laid-Open Publication Nos. 63-161552 and 63-161553). According to this method, recording and reproduction of a large capacity, e.g., a density of $10^{12}$ bit/cm$^2$ when the recorded bit size is 10 nm, can be performed.

Reproduction methods for the above-described information processor include, for example, a method of detecting differences in a level of a recording medium surface corresponding to recorded bits by scanning the recording medium surface with a probe electrode while maintaining a constant current flow between the probe electrode and the recording medium surface, and a method of utilizing a phenomenon that a current flowing between a probe electrode and a recording medium surface increases in a high-conductivity region corresponding to a recorded bit, i.e., the current is detected to reproduce data represented by recorded bits.

However, in a case when the former reproduction method is adopted, preexisting differences in the level of the medium surface and actual recorded bits in the medium surface cannot be discriminated from each other based solely on an amount of movement of the probe electrode, because the probe can follow even small differences in level in the recording medium surface. Also, in this case, high-speed scanning is difficult because a maximum controllable scanning frequency is determined by an upper limit of the range of a feedback control circuit for maintaining a constant current.

In a case when the latter reproduction method is adopted, the current also is changed by differences in level in the medium surface. These changes in the current caused by differences in the level of the medium surface cannot be discriminated from changes due to recorded bits, as in the case of the former method, although high-speed scanning is possible.

Another problem may be encountered as described below. The probe electrode and the medium surface are maintained at a certain distance from each other, and this spacing serves as an insulating barrier. This barrier, however, is common to recorded bit writing areas and non-writing areas, and acts effectively as a tunnel resistance inserted in series. Therefore, if the distance between the probe electrode and the medium surface is changed, the ratio of current detected at writing areas to current detected at non-writing areas may become so large (or small) that recorded bits cannot be read accurately.

Accordingly, it is necessary to form a reproduction signal so that components caused by differences in the level of the recording medium surface are removed. It is also necessary to minimize and maintain at a constant level the tunnel resistance of the insulating barrier between the probe electrode and the recording medium surface so that the reproduction signal ratio based on the existence/non-existence of recorded bits is maximized. It is also preferable that the change in the applied voltage for recording cannot easily influence the control of the distance between the probe electrode and the medium.

Further, if the distance between the recording medium and the probe electrode is large, the resolution of the STM is reduced. That is, in terms of recording density, it is also preferable to minimize the distance between the recording medium and the probe electrode.

To remove components caused by differences in the level of the medium surface from the reproduction signal, and to remove the effects of the applied voltage on the distance control at the time of recording, a method of maintaining a constant distance between the medium surface and the probe using a quantity other than the current flowing therebetween is needed. An atomic force acting between the medium surface and the probe is an example of such a quantity. An atomic force microscope (AFM) for controlling the distance using the atomic force acting between the medium surface and the probe is disclosed in Japanese Patent Laid-Open Publication No. 1-245445.

In an AFM, a probe electrode is supported by an elastic body, a force acting between a probe electrode tip and a recording medium surface is balanced with a spring force of a deformation of the elastic body, and feedback control is performed so that the amount of this deformation is constant.

For this AFM control, a distance control is based on an atomic force acting between the medium surface and the probe electrode tip. To realize an atomic resolution, therefore, a probe electrode having a very sharp extreme end (a tip curvature ordinarily of 0.1 μm or less) is used. If such a probe electrode is used, the above-mentioned atomic force acts on a very small area (on an atomic order) such that the density of the force applied to the medium surface is very high. For this reason, if organic molecules are used as the medium, there is a possibility of a deformation of the medium surface or a separation of the medium caused by a local force.

Further, the resistance to the movement of the probe electrode during scanning is increased by the interatomic force so that the stability of scanning is reduced. It is therefore difficult to stably read changes in electrical characteristics and the like of the recording medium surface.

SUMMARY OF THE INVENTION

In view of the above-described problems, an object of the present invention is to provide an information processor which records and reproduces information based on an application of the principle of STMs or AFMs, and which can read out information at a high speed with high reliability at the time of information reproduction, and a method of processing information using such an information processor.

According to the present invention, a probe electrode having a tip of a comparatively large curvature is controlled to be maintained close to a recording medium formed of a substrate electrode having a high degree of smoothness and a recording layer formed on the substrate electrode, whereby an information processing operation can be performed with high reliability.

That is, according to one aspect of the present invention, there is provided an information processor for use with a recording medium having a recording layer having a characteristic of one of an insulator and a semiconductor. The information processor includes a substrate electrode in the recording medium, on which the recording layer is formed, the substrate electrode having a maximum difference in surface level of a 1×1 μm surface region of 1 nm or less, and also includes at least one probe electrode disposed close to the recording medium and having a tip, the tip of said at least one probe electrode having a radius of curvature in the range 0.1 to 200 μm. The processor also includes at least one of a circuit for applying an information recording pulse voltage to the at least one probe electrode and a circuit for applying an information reproducing pulse voltage to the at least one probe electrode, and means for controlling the distance between a surface of the recording medium and the tip of the at least one probe electrode.

According to another aspect of the invention, there is provided an information processing method comprising the steps of providing an information processor according to the present invention, providing a recording medium and performing at least one of recording information on the medium, reproducing information from the medium and repeatedly recording and erasing information on the medium using the information processor.

According to yet another aspect, the present invention provides a method of manufacturing a recording medium comprising a substrate electrode having a maximum difference in surface level of 1 nm in a 1 μm square region of the surface. The method includes a step of forming a substrate electrode by dissolving a crystal-forming material in an oxidizing solution, immersing a substrate in the solution, decomposing and precipitating the crystal-forming material on the substrate, and controlling a rate of precipitation to prevent formation of a granular polycrystal. The method further includes a step of forming a recording layer on the substrate electrode, the recording layer being formed with a thickness small enough to directly reflect a surface state of the underlying electrode.

DESCRIPTION OF THE PREFERRED EMBODIMENTS

A method of manufacturing a substrate electrode having a high degree of smoothness, i.e., a maximum difference in level of 1 nm in a surface of a 1 μm square region (a square having 1×1 μm sides) will be described below.

For example, a gold crystal in the form of a flat plate is formed on a silicon substrate by a process including a step of immersing a substrate in a gold complex water solution which is formed by dissolving gold in an oxidizing solution having a property of dissolving gold, e.g., an iodine solution formed by dissolving $I_2$ in a KI water solution (in which gold is dissolved mainly as a complex having an $[AuI_4]^-$ structure), and removing $I_2$ out of the reaction system to reduce the dissolubility of the gold, i.e., evaporating $I_2$ by heating or reducing $I_2$ to $I^-$ by using a reducing agent, and a step of decomposing and precipitating the gold complex on the substrate by heating or the like. Since a granular polycrystal is formed if the precipitation speed is high, a precipitated crystal is grown as the flat gold crystal upon balancing the rate of etching by oxidizing dissolution reaction with $I_3^-$ and the complex decomposition rate.

Figure 1A:
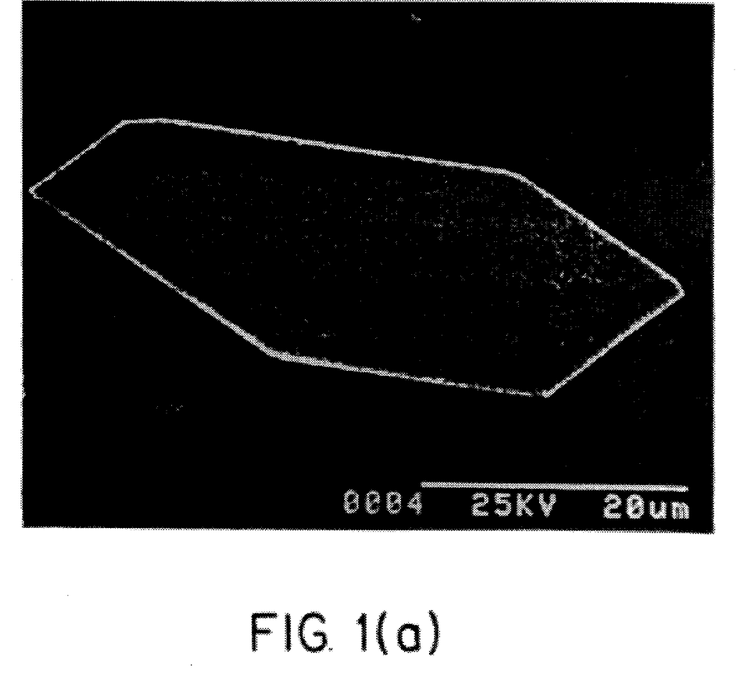
FIGS. 1(a) and 1(b) are optical microscopic images of electrode substrates each having a flat gold crystal formed on a silicon substrate.
Figure 1B:
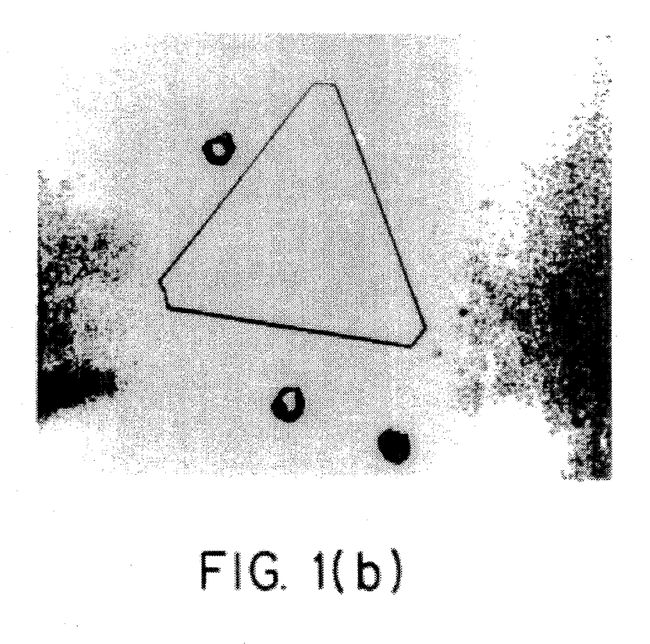
Figure 2:
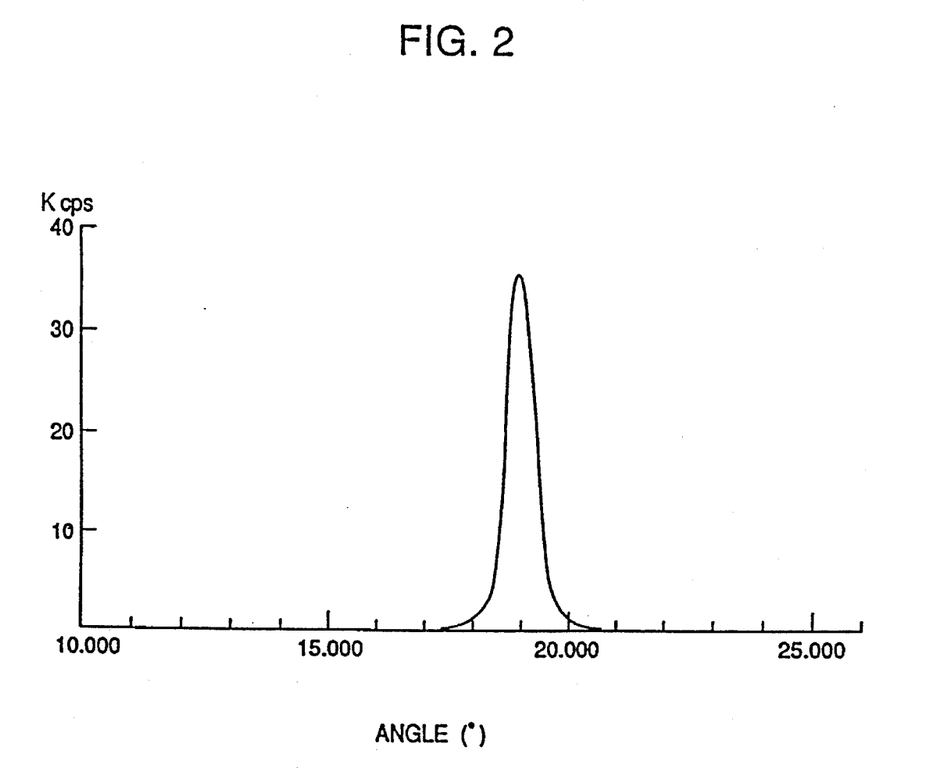
FIG. 2 is a diagram of a small-angle X ray reflection/diffraction spectrum of the electrode substrates of FIG. 1.

FIGS. 1(a) and 1(b) are optical microscopic images of flat gold crystals formed on silicon crystal substrates formed in this manner. A gold crystal shown in FIG. 1(a) has a generally hexagonal planar shape, but crystals having a planar shape with a three-fold symmetry axis (FIG. 1(b)) or asymmetric crystals having a shape deformed from that shown in FIG. 1(b) are generally observed. However, as shown in FIGS. 1(a) and 1(b), the gold crystals have facets clearly formed in correspondence with crystal faces. Electron channeling patterns in the flat surfaces of the gold crystals were measured using an SEM, and it was thereby confirmed that there were substantially no defects in the [111] orientation. The dispersion angle of surfaces of polycrystalline gold electrode substrates formed of such flat crystals, i.e., surfaces in the (111) plane, was 0.9° or less, as represented by X-ray diffraction data shown in FIG. 2 (measured with an X-ray diffraction apparatus model RAD3B, manufactured by Rigaku Denki). The parameters of FIG. 2 were distribution angle: 0 924°, tube bulb: Cu, tube voltage 30 kV, tube current: 20 mA, sampling width: 0.020°, scanning speed: 2.000°/min, diversion/scattering slit: 1°/1° and light-receiving slit: 0.30 mm. Thus, electrode substrates having high orienting performance are obtained using this method. Under more preferable conditions, an electrode substrate having a dispersion angle of 0.6° or less can be obtained. Further, by using the flat gold crystal, electrode substrates having a higher degree of smoothness can be formed on various substrate materials with a small dispersion angle in the [111] orientation not larger than 1°. The ratio of the maximum diameter of the (111) plane of the gold crystal to the height of the flat crystal is about 30. Generally, crystals having a corresponding ratio of 10 or more can easily be obtained. Under preferable conditions, crystals having a corresponding ratio of 100 or more can be obtained.

Figure 3A:
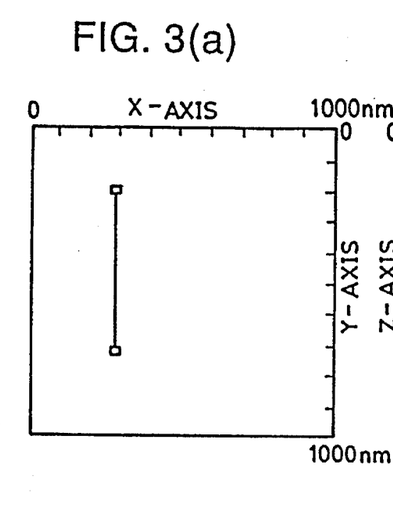
FIGS. 3(a) and 3(b) are respectively an STM image and a level profile of a surface of the electrode substrates of FIG. 1.
Figure 3B:
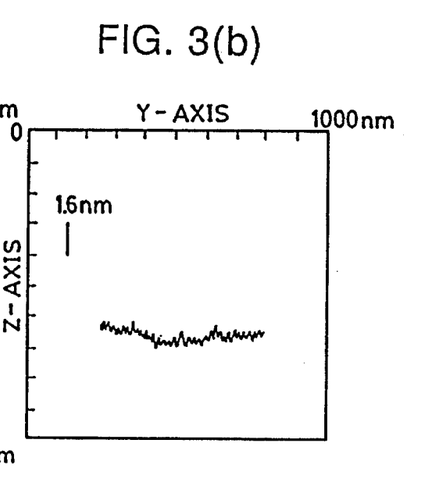

FIGS. 3(a) and 3(b) show STM images of (111) planes grown in this manner. As shown in a 1 μm square STM image in a (111) plane in FIG. 3(a), the gold crystal is substantially flat in a 1 μm square area. As differences in the surface level of the gold crystal, atomic-step long-period differences in level of 1 nm or less are exhibited as represented by a level profile (FIG. 3(b)) in the direction along the Z-axis. By the above-described process, an electrode substrate having a high degree of smoothness can be manufactured. That is, an electrode substrate can be manufactured in which the difference between the deepest valley and the highest peak (maximum difference in surface level) in a 10 μm square area (a square having 10×10 μm sides) is 1 nm or less and in which a peak value (dispersion peak) of dispersion of differences in surface level from an average value of differences in surface level is 0.5 nm or less.

The size of the flat gold crystal is not smaller than 1 μm and not greater than 1 mm under ordinary conditions, and a crystal having a size of 10 mm or less, i.e., the size of several mm square (a square having 1×1 mm sides) can be obtained under optimal conditions.

A substrate used in accordance with the present invention may be formed of any material as long as the occurrence of serious corrosion during the electrode formation can be avoided. For example, a substrate formed of any insulating material, such as mica, MgO, $SiO_2$, $Si_3N_4$, and organic high molecular material, and of conductive material, such as silicon (crystalline, amorphous), graphite, (HOPG), metal, and compounds of metal, can be used.

Characteristics of the flat crystal and the process for manufacturing the crystal have been described with respect to gold. However, a similar technique for growing a flat crystal can be applied to other precious metals capable of forming a halogenated complex, e.g., Pt, Pd, Rh, Ir or the like, as well as to gold. Application of a similar technique to a cyano complex and a sulfurous acid complex is also possible.

Figure 9:
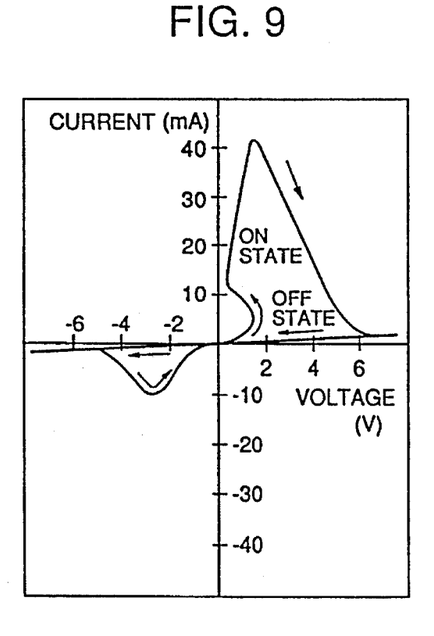
FIG. 9 is a diagram of current-voltage characteristics obtained by a metal/insulator/metal (MIM) structure device formed by interposing the recording layer in accordance with the present invention between metallic electrodes.
Figure 10:
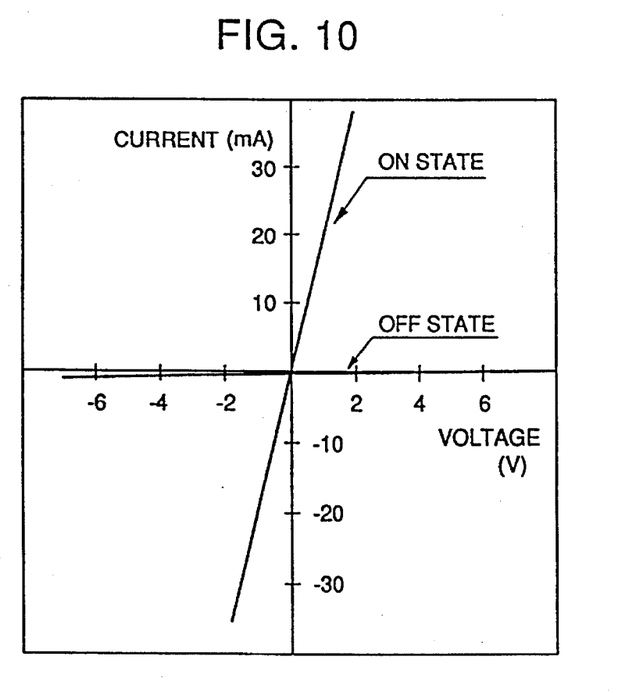
FIG. 10 is a diagram of a memory effect obtained by an MIM structure device formed by interposing the recording layer in accordance with the present invention between metallic electrodes.

As a recording layer having an insulator characteristic in accordance with the present invention, an organic monomolecular film formed by depositing molecules including both a group having a π electron level and a group having only a σ electron level on an electrode or a built-up film of the monomolecular film can be used. The electric memory effect of the recording medium in accordance with the present invention is obtained when the organic monomolecular film or a built-up film of the same is disposed between a pair of electrodes, and this effect is exhibited as current-voltage characteristics [see, e.g., K. Sakai, et al, Appl. Phys. Lett., 53, 1274 (1988)] such as those shown in FIGS. 9 and 10 (a switching characteristic is shown in FIG. 9, a memory characteristic is shown in FIG. 10). Two states (an on state and an off state), i.e., a low-resistance state and a high-resistance state, can be reversibly converted by application of a voltage exceeding a threshold value at which each state can be converted into the other. Also, each state can be maintained (memorized) without applying a voltage.

There are many and various organic materials having groups of π electron levels applicable to the present invention, because almost all organic materials exhibit insulating or semi-insulating characteristics. Examples of a pigment composition having a K electron system suitable for the present invention are pigments having a porphyrin skeleton, such as phthalocyanine and tetraphenylporphyrin, azulene pigments having a bonding chain formed of a squarilium group and a croconic methine group, cyanine-like pigments formed by bonding two nitrogen-containing heterocyclic rings such as quinoline, benzothiazole or benzoxazole with a squarilium group and a croconic methine group, or cyanine pigments, condensed polycyclic aromatic compounds, such as anthracene and pyrene, chain compounds formed by polymerizing aromatic rings or heterocyclic ring compounds, polymers of diacetylene, derivatives, relatives and charge transfer complexes of tetracyanoquinodimethane or tetrathiafulvalene, and metallic complex compounds, such as ferrocene and toris(bipyridine) ruthenium complex. Examples of a high polymer material suitable for the present invention are condensed polymers, such as polyimides, and bipolymers, such as bacteriorhodopsin and protein.

For the formation of the above-described recording layer, a deposition method, a cluster ion beam method and the like, for example, are applicable. However, among well-known conventional methods, the Langmuir-Blodgett (LB) method (described below) is particularly suitable in terms of controllability, facility and reproducibility. By the LB method, a monomolecular film of an organic compound having a hydrophobic portion and a hydrophilic portion in one molecule or a built-up film of the monomolecular film can be easily formed on a substrate, and an organic super thin film having a thickness on a molecular order and uniform in thickness and size over a large area can be stably supplied. Accordingly, a recording medium directly reflecting the surface state of the base electrode substrate can be manufactured.

The LB method is a method of forming a monomolecular film or a built-up film of the monomolecular film. The method utilizes a phenomenon in which molecules having a structure including a hydrophilic portion and a hydrophobic portion in one molecule form a monomolecular layer on the surface of water with the hydrophilic radicals facing downward when the two portions (amphiphatic properties) are suitably balanced. Groups forming hydrophobic portions may be hydrophobic groups generally widely known, such as saturated or unsaturated hydrocarbon groups, condensed polycyclic aromatic groups and chain polycyclic phenyl groups. One of such groups or a combination of some of them form hydrophobic portions of the above-described molecules. Typical examples of components of hydrophilic portions are carboxyl groups, ester groups, acid amide groups, imide groups, hydroxyl groups, and amino groups (first, second, third and fourth ones). One of such groups or a combination of some of them form hydrophilic portions of the above-described molecules.

Any organic molecules having such hydrophobic and hydrophilic groups well balanced and having a suitable size can form a monomolecular film on the surface of water and can be used as a material particularly suitable for the present invention. It is desirable to use a polymer compound or a large cyclic compound such as phtalocyanine, to obtain good heat resistance. For example, if a polymer compound such as a polyimide is used, the film thickness per one layer can be reduced to about 4 Å, yet the medium will have high heat resistance.

Electric memory effects of these compounds having a π electron level have been observed with respect to film thicknesses of several tens of nm or less. However, it is preferable to set the thickness in a range of 5 to 300 Å, to obtain a good film forming effect and uniformity.

In a recording medium formed to have the above-described recording layer on the above-described substrate electrode in accordance with the present invention, the maximum difference in surface level in a 1 mm square region is 1.0 nm or less.

Thus, the surface of the recording medium in accordance with the present invention is very flat in comparison with the size of the recording region (0.1 μm square or smaller). It is therefore possible to stably read electrical characteristic changes of the recording medium surface with high reliability without using a probe electrode pointed very acutely.

The radius of curvature of a tip of a probe electrode used in accordance with the present invention is within the range of 0.1 to 200 μm and, more preferably, in the range of 1 to 100 μm. If the radius of tip curvature is smaller than 0.1 μm, the density of an interatomic force acting between the probe electrode and the recording medium surface during controlled traveling of the probe electrode close to the recording medium surface is very large and the resistance to the movement for scanning is so large that scanning cannot be performed stably. Further, the recording layer surface formed of organic molecules or the like can easily be deformed or separated.

If the radius of the tip curvature exceeds 200 μm, the STM or AFM resolution is reduced and the recording density is insufficient for practical purposes.

The present invention will be described in more detail with reference to the drawings.

Figure 4:
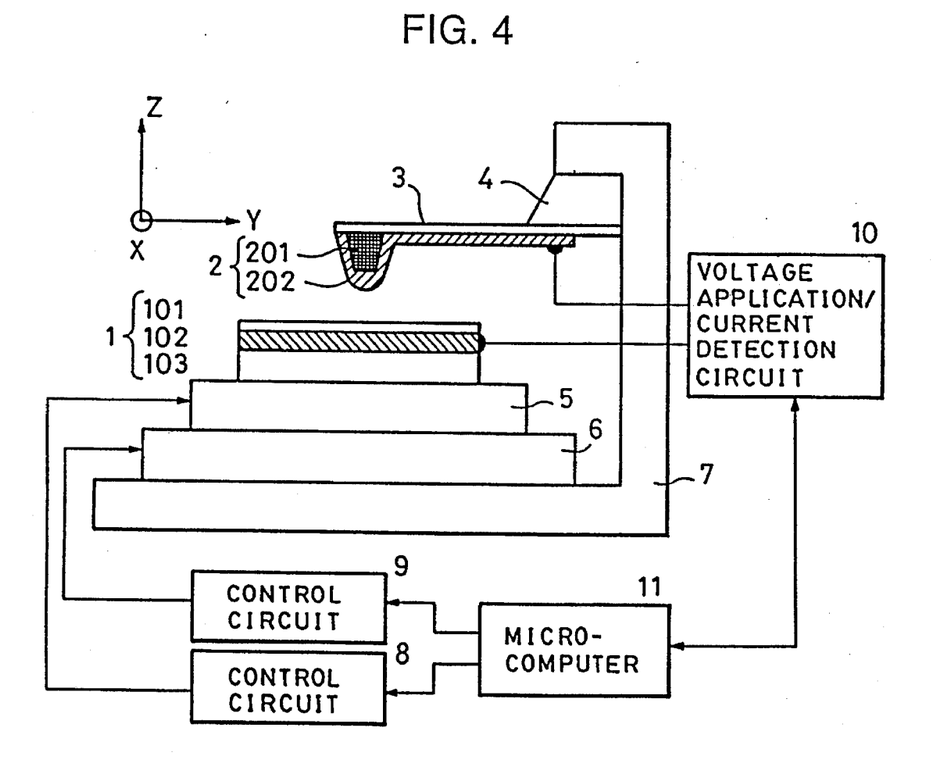
FIG. 4 is a block diagram of an example of an information processor in accordance with the present invention.
Figure 6:
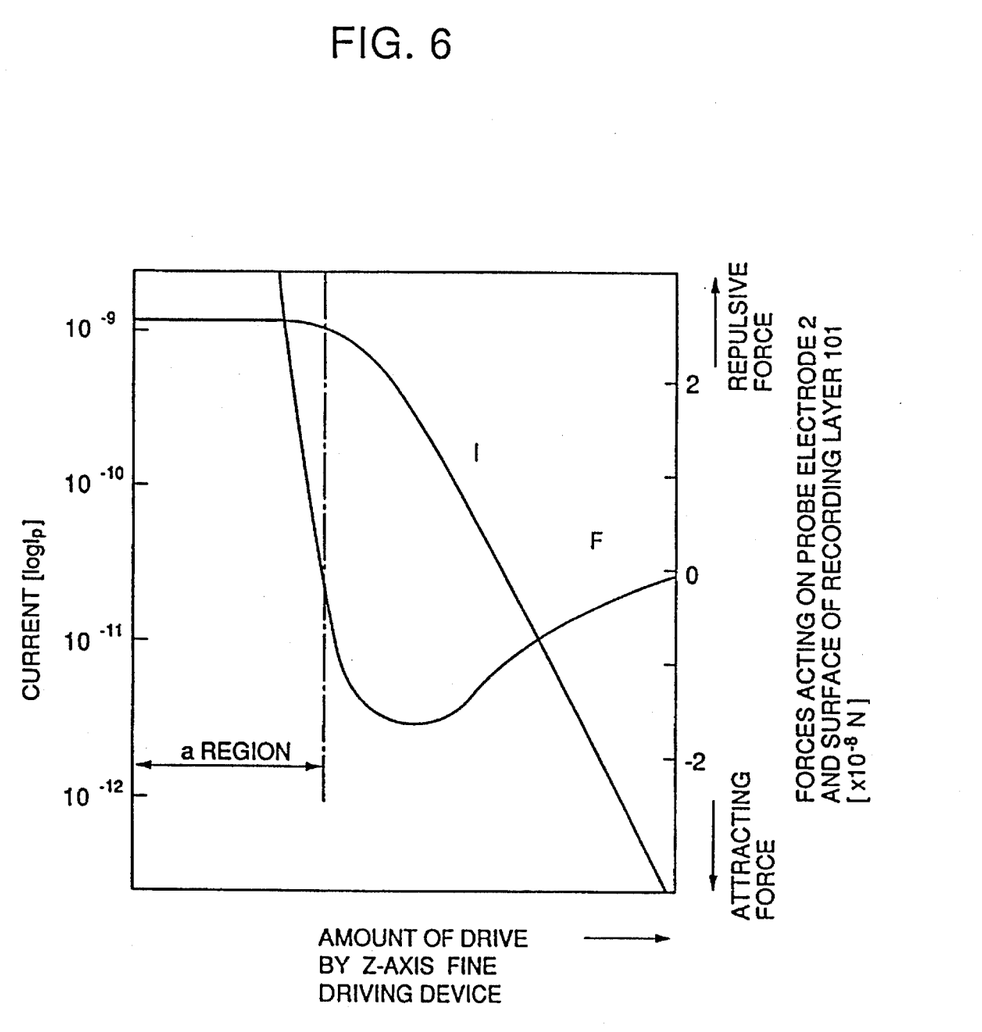
FIG. 6 is a diagram showing changes in current flowing between the probe electrode and the recording medium surface and changes in a force acting between the same when the distance between the probe electrode and the recording medium surface changes.

FIG. 4 is a block diagram of an example of the information processor in accordance with the present invention. In FIG. 4 are illustrated a recording medium 1 formed of a substrate 103, an electrode 102, and a recording layer 101, a probe electrode 2 disposed so as to face the recording medium 1, a cantilever 3 to which the probe electrode 2 is attached, and a supporting member 4 on which the cantilever 3 is supported. The probe electrode 2 can be displaced in the direction along the Z-axis by the cantilever 3. The recording medium 1 can be finely moved along each of the X-, Y- and Z-axes by an XYZ fine driving device 5, and can also be moved by an XYZ rough driving device 6. The cantilever supporting member 4 and the XYZ rough driving device 6 are fixed on a base 7 which is placed on a vibration-free table (not shown). To measure a force acting on the cantilever 3 and the surface of the recording medium 1 as shown in FIG. 6, a means for measuring the amount of bending of the cantilever 3 (e.g., a means for measuring the displacement of the tip of the cantilever 3 by an optical lever method) may be provided. [See, e.g., G. Meyer and N. M. Amer, Appl. Phys. Lett., 53, 1045 (1988); H. J. Mamin, et al., Appl. Phys. Lett., 53, 1563 (1988).]

The arrangement of this processor is such that a repulsive force acting between the probe electrode 2 and the recording medium 1 is balanced with the spring force of the deformation of the cantilever 3. The present invention is not limited to this arrangement and may have the probe electrode provided at a center of a beam supported at opposite ends. It is preferable to use Au, Ni, SUS or the like as the material of the beam. To make a finer beam, an $SiO_2$ thin film, frequently used in the field of micromechanics, may be used. Since the force acting between the probe electrode and the recording medium is very small, it is preferable to minimize the mass of the probe electrode and the elastic supporting member. To increase the displacement, it is preferred that the elastic supporting member is soft but strong against external vibrations.

For this processor, the probe electrode 2 is made by depositing Au on the cantilever 3 formed of an $SiO_2$ substrate to provide conductivity thereon and by depositing Au thicker at one end. Recording, reproduction and erasing are performed by scanning the probe electrode 2 on the recording medium 1 surface while maintaining the probe electrode 2 close to the recording medium 1 so that a repulsive force acts between the probe electrode 2 and the recording medium 1, and by applying a desired voltage between the probe electrode 2 and the recording medium 1 by a voltage application circuit 10.

Various methods may be applied as a method of controlling the tip curvature of the probe electrode. For example, a method based on electrolytic etching or heat fusion may be used. However, the method of controlling the probe electrode tip curvature or the method of shaping or processing the probe electrode is not limited to such a method.

The above-described information processor of the present invention has the following advantages.

(1) Overlapping between a signal component $f_1$ caused by differences in the level of the recording medium surface and data signal components does not occur and there is no possibility of reduction in S/N due to expansion of the spectrum of $f_1$. That is, the data error rate can be reduced.

(2) There are substantially no differences in the level of the recording medium surface, and the displacement of the probe electrode along the Z-axis is small during XY scanning performed with a small spacing between the recording medium surface and the probe electrode. Therefore, scanning can be performed at a very high speed, enabling high-speed data reading/writing.

(3) Since there are substantially no differences in the level of the recording medium surface, the position of the tip of the probe electrode, i.e., the position of an atom at the tip through which a tunnel current flows can be selected stably. Occurrence of a tunnel current between a plurality of atoms of the probe electrode and the recording layer, which can be observed at a recording medium surface having differences in level, i.e., a ghost phenomenon, can be avoided and reading can be performed with high reliability.

Figure 5:
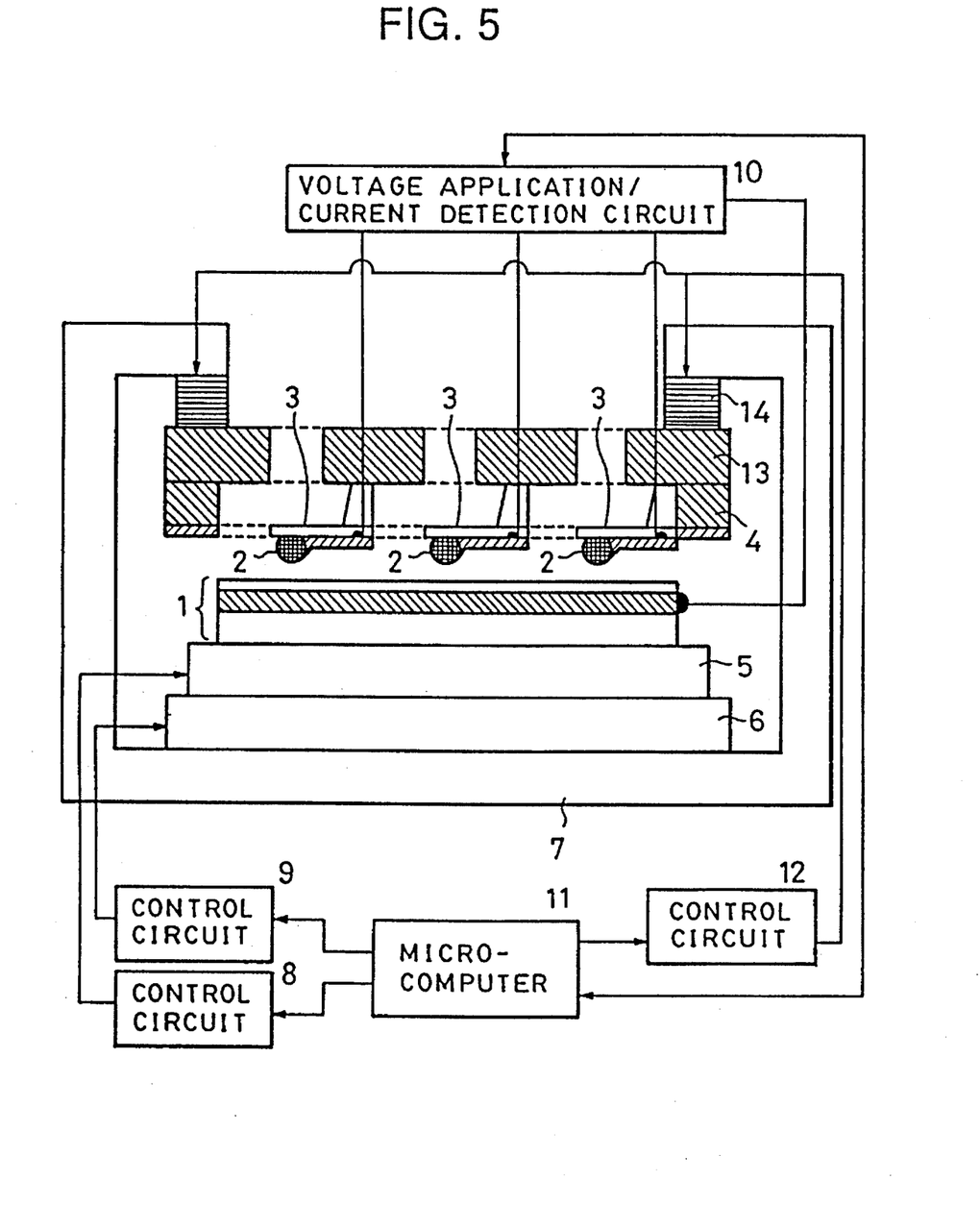
FIG. 5 is a block diagram of another information processor having a plurality of probe electrodes in accordance with the present invention.

According to the present invention, a recording and/or reproducing processor having multiple probe electrodes as shown in FIG. 5 can be formed.

In the processor shown in FIG. 5, an Si substrate 4 on which cantilevers are formed is fixed on a supporting member 13 which is attached to a base 7 through at least three piezoelectric elements 14. The piezoelectric elements 14 are independently driven with a piezoelectric element control circuit 12 which is controlled by a microcomputer 11. A voltage is applied to each of probe electrodes 2 by a voltage application/current detection circuit 10, and a current flowing between each probe electrode 2 and the recording medium 1 is independently detected by the voltage application/current detection circuit 10.

The above-described examples of the information processor are processors driven in an AFM control state. They can also be arranged to perform recording and reproduction at the same resolution in an STM control state. The processor in accordance with the present invention may be a processor for performing both recording and reproduction, or a processor for performing only recording or reproduction.

EXAMPLES

Examples of the present invention will be described below.

Example 1

As Example 1, an information processor such as that shown in FIG. 4 was made and experiments of recording, reproducing and erasing information were performed.

Cantilever 3 was made using a silicon etching technique. A cantilever having a length of 100 μm, a width of 20 μm and a thickness of 1 μm was formed of $SiO_2$ by an anisotropic etching technique highly utilizing silicon crystal properties. This technique is well known [see, e.g., K. E. Petersen, Proc. IEEE 70,420 (1982)]. Probe electrode 2 was made, in the process of forming cantilever 3 by the anisotropic etching, in such a manner that a conical Au tip 201 having a height of 3 μm and a diameter of 5 μm at its bottom was formed on one end of $SiO_2$ cantilever 3 by a spit method. Au 202 was then vacuum-deposited to a thickness of 300 Å to provide conductivity. Thereafter, a tip portion of the probe was etched by electrolytic etching while being observed with a scanning tunnel microscope, until the radius of the tip curvature became 5 μm. XYZ fine driving device 5 uses cylindrical piezoelectric elements to which desired voltages are applied to finely move recording medium 1 in the directions along X-, Y- and Z-axes.

Other types of XYZ fine driving device 5, e.g., a type using a tripod piezoelectric element or a bimorph type, can be used.

XYZ rough driving device 6 has an XYZ stage. Probe electrode 2 and electrode 102 of recording medium 1 are connected to voltage application/current detection circuit 10 formed of a voltage application circuit for applying voltages for recording and erasing and a current detection circuit for detecting a current flowing between probe electrode 2 and recording medium 1. XYZ fine driving device 5 and XYZ rough driving device 6 are driven by control circuits 8 and 9, respectively. These circuits and voltage application/current detection circuit 10 are connected to and controlled by microcomputer 11.

In this example, recording medium 1 was made as described below.

4 g of potassium iodide (KI) and 0.6 g of iodine ($I_2$) were dissolved in 50 ml of pure water, and a 5,000 Å thick gold thin film (about 0.08 g in weight) formed by vacuum deposition was then dissolved completely in the iodine solution. The gold-iodine complex solution was prepared as a stock solution. 10 ml of this stock solution was extracted and diluted with 50 ml of pure water to form a reaction mother liquor. A silicon substrate having a naturally oxidized film etched with hydrofluoric acid was immersed in the mother liquor and was heated at 80° C. on a hot plate. When iodine was sublimated so that the solution was transparent and slightly yellowish, a gold crystal in the form of a flat plate was precipitated. A flat gold crystal was observed over a substrate surface by observation through an optical microscope. The plane-orientation dispersion angle of this electrode substrate was measured and it was 0.4°. The surface of the flat gold crystal was then observed with an STM, and a maximum difference in surface level of 0.8 nm and a dispersion peak of 0.4 nm in a 10 μm square area were determined.

Four layers of a polyimide LB film having a composition shown below were formed on the thus-formed smooth electrode substrate by an ordinary method.

(1)

Next, the surface state of the recording medium made by the above-described process was examined with an STM. The recording medium surface reflected the smoothness of the electrode, and a maximum difference in surface level of 0.9 nm and a dispersion peak of 0.4 nm in a 10 μm square area were determined.

Next, a specific method of recording, reproducing and erasing will be described below.

Recording medium 1 is first fixed on XYZ fine driving device 5, a bias voltage of 100 mV is applied between probe electrode 2 and Au electrode 102, and XYZ rough driving device 6 and XYZ fine driving device 5 are driven to bring recording medium 1 close to probe electrode 2. The distance between probe electrode 2 and recording medium 1 is changed while a current flowing therebetween is monitored. A current characteristic such as that shown in FIG. 6 (represented by a curve I in FIG. 6) is thereby observed.

On the other hand, a force acts between probe electrode 2 and recording medium 1 when probe electrode 2 and recording medium 1 are brought close to each other, and cantilever 3 is deformed by this force. FIG. 6 also shows the result of measurement of the amount of this deformation performed simultaneously with the measurement of the current characteristic by using an optical lever system for detecting the deformation through a shift of a laser beam reflected by the cantilever (a curve F in FIG. 6). The abscissa of FIG. 6 shows the distance between probe electrode 2 and the surface of the recording layer 101; to the left is small; to the right is large.

In a region "a" of FIG. 6 where a repulsive force acts between probe electrode 2 and recording medium 1, the current flowing therebetween is substantially constant with respect to the distance therebetween. Then, for scanning, probe electrode 2 and recording medium 1 are brought close to each other at a distance such that a repulsive force acts between electrode 2 and recording medium 1 (specifically, about $10^{-8}$ [N]) by the control of the microcomputer while the current is monitored through the circuit 10.

In this state, XYZ fine driving device 5 is operated to move recording medium 1 in the directions of the X- and Y-axes while fixing the position thereof in the direction of the Z-axis, thereby scanning the recording surface with probe electrode 2. At the time of information recording, a voltage higher than a threshold value at which recording medium 1 is changed into the ON state is applied at predetermined positions, in accordance with information to be recorded, by the circuit 10 during scanning performed as described above. The information is thereby recorded on recording medium 1.

At the time of erasing, a voltage higher than a threshold value at which the medium is returned to the OFF state may be applied in accordance with erasing information as in the case of recording. At the time of reproduction, the current flowing between probe electrode 2 and recording medium 1 is detected through the circuit 10 during scanning while a voltage lower than the above-mentioned threshold values is applied. Changes in the detected current represent information recorded on recording medium 1.

In this example, as described above, the tip of probe electrode 2 and the recording medium surface are brought close to each other until a repulsive force starts acting therebetween, probe electrode 2 is scanned on the recording medium 1 surface while the probe electrode supporting member is elastically deformed by the repulsive force, and a state changing voltage is simultaneously applied between probe electrode 2 and recording medium 1 to perform recording or erasing, or a current flowing between the probe and the recording medium is detected while a very small voltage is applied to detect regions having different conductivities, i.e., recorded bits.

Since the probe electrode supporting member is in a state of being elastically deformed by the repulsive force acting between the tip of the probe electrode and the recording medium surface, the distance between probe 2 and recording medium 1 can be maintained substantially constant, as described below. That is, if the tip of the probe electrode is brought closer to the medium surface by a difference in the level of the medium's surface so that the repulsive force is increased, the deformation of the supporting member is increased and the tip of the probe electrode moves away from the medium surface. If the tip of the probe electrode moves away from the medium surface so that the repulsive force is smaller, the deformation of the supporting member is reduced and the tip of the probe electrode moves closer to the medium surface. As long as the amount of deformation of the probe electrode supporting member caused by differences in the surface level during scanning is within the elastic deformation range, the distance between probe electrode 2 and recording medium 1 can be maintained substantially constant, even though no actuator is attached to the supporting member to provide feedback-control of the same according to the amount of deformation thereof.

In the above-described driven state, the position of the tip atom of the probe through which the current flows can be selected stably even if a probe electrode having a large tip curvature is used, because there are substantially no differences in the level of the recording medium surface. Accordingly, occurrence of a current between a plurality of atoms of the probe electrode and the recording layer, which can be observed at a recording medium surface having differences in level, i.e., a ghost phenomenon, can be avoided and reading can be performed with improved reliability. In comparison with a case of using a very acute probe electrode, scanning can be performed more stably by limiting the resistance to the movement for scanning, and changes in electrical characteristics of the recording medium surface can be read stably with high reliability.

Experiments of recording, reproducing and erasing using this processor will be described below.

Figure 7:
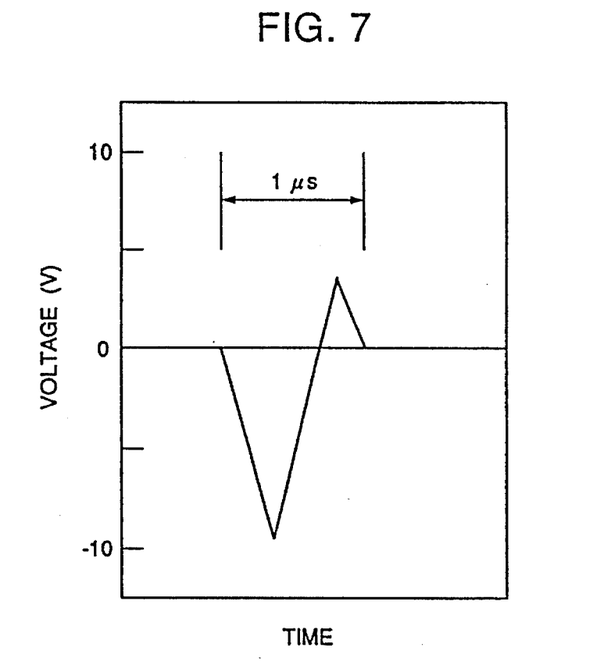
FIG. 7 is a diagram of a recording pulse voltage waveform.

The distance between probe electrode 2 and recording medium 1 is reduced to maintain a relationship in the region "a" of FIG. 6 therebetween, while the detected current is monitored. In this state, outputs from control circuits 8 and 9 of XYZ fine driving device 5 and XYZ rough driving device 6 are held and a triangular wave pulse voltage, having a waveform such as that shown in FIG. 7 and having a magnitude equal to or higher than the threshold voltage $V_{th\ ON}$ at which the ON state is established, is applied between probe electrode 2 and Au electrode 102. Thereafter, the 100 mV bias is applied again and the current is measured. The current is about 8 μA and conversion into the ON state is recognized.

Figure 8:
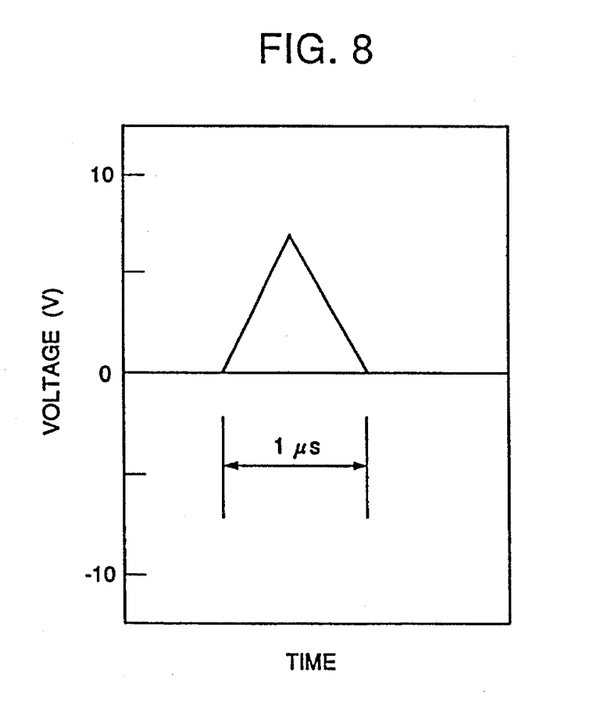
FIG. 8 is a diagram of an erasing pulse voltage waveform.

Next, a triangular wave pulse voltage having a waveform such as that shown in FIG. 8 and having a magnitude equal to or higher than the threshold voltage $V_{th\ OFF}$ at which conversion from the ON state into the OFF state occurs is applied. When the 100 mV bias is thereafter applied again, the current is about 1 nA and a return to the OFF state is confirmed.

In a state when the distance between probe electrode 2 and recording medium 1 is reduced to maintain a relationship in the region "a" of FIG. 6 therebetween as described above, XYZ fine driving device 5 is operated for driving only in the direction of the X-axis while being fixed with respect to the Y- and Z-axes, and the current is monitored. In this state, the current has a substantially constant value of about 1 nA. Next, during driving only in the direction of the X-axis, a triangular wave pulse voltage having a waveform such as that shown in FIG. 7 and having a magnitude equal to or higher than the threshold voltage $V_{th\ ON}$ is applied between probe electrode 2 and Au electrode 102. Thereafter, driving only in the direction of the X-axis is repeated with a constant bias of 100 mV, and the current flowing between probe electrode 2 and Au electrode 102 is measured. The measured current changes about four places in a 10 nm cycle. It is thereby confirmed that the ON state has been written periodically. The ratio of the currents in the ON and OFF states is maintained at an approximately constant value.

The regions in which the ON state is periodically written are scanned again using X-axis driving alone, and the XYZ fine driving device 5 is stopped on an arbitrary one of the ON state regions. While this position is maintained, a triangular wave pulse voltage having a waveform such as that shown in FIG. 8 and having a magnitude equal to or higher than the threshold voltage $V_{th\ OFF}$ is applied between probe electrode 2 and Au electrode 102. Scanning only in the direction of the X-axis is repeated and the current is measured. It is thereby confirmed that the ON state of the regions to which the pulse voltage has been applied has been erased and that the OFF state exhibiting a current of about 1 nA has been restored. The recording regions are scanned while the voltage between probe electrode 2 and Au electrode 102 is set to a voltage equal to or higher than the threshold voltage $V_{th\ OFF}$, as in the case of the above-described arbitrary bit erasing, and the current is thereafter measured. It is thereby confirmed that the current has a substantially constant value of about 1 nA, indicating that the ON state recorded in 10 nm cycles has been entirely erased to restore the OFF state.

Further, the XYZ fine driving device 5 is controlled to write 1 μm stripes at various pitches between 1 nm and 1 μm using the above-described method, and the resolution is measured. With respect to pitches of 4 nm or greater, current changes through about four places are always recognized at the same pitch as the writing pitch.

In the above-described experiments, no deformation of the recording medium surface caused by the probe electrode and no abrupt change in the position of the probe are observed and no errors occur in the probe electrode scanning.

Example 2

Cantilevers having a length of 300 μm, a width of 50 μm and a thickness of 1 μm are formed of $SiO_2$ by the cantilever forming method used in Example 1, and Au is deposited thereon to form a film having a thickness of 300 Å to provide electroconductivity. Next, very small balls having diameters of 10 to 100 μm and formed by melting Au with an electron beam are bonded to ends of the cantilevers with a conductive adhesive. Except for these points, the same experiments as those described for Example 1 are made to measure the recording/reproduction performance. Table 1 shows the results of the experiments. With respect to each ball, a resolution of 5 nm or higher is achieved, scanning can be performed stably by limiting the resistance to the movement for scanning the recording medium surface, and changes in electrical characteristics of the recording medium surface can be read stably with high reliability.

TABLE 1

| Diameter of small ball | Resolution |
|---|---|
| 15 μm | 4 nm |
| 45 μm | 4 nm |
| 100 μm | 5 nm |

As described above, the surface of the recording medium used in accordance with the present invention is very flat in comparison with the size of the recording regions, and it is thereby possible to stably read changes in electrical characteristics of the recording medium surface with high reliability without using a probe electrode pointed very acutely.

Moreover, in comparison with a case of using a very acute probe electrode, scanning can be performed more stably by limiting the resistance to the scanning movement, and changes in electrical characteristics of the recording medium surface can therefore be read stably with high reliability.

The individual components shown in outline or designated by blocks in the drawings are all well-known in the information processor art and their specific construction and operation are not critical to the operation or best mode for carrying out the invention.

While the present invention has been described with respect to what is presently considered to be the preferred embodiments, the invention is not limited to the disclosed embodiments. To the contrary, the scope of the appended claims should be accorded the broadest interpretation to encompass all of the various modifications and equivalent structures and equivalent functions included within the spirit of the present invention as set forth in the claims.

What is claimed is:

1. An information processor for use with a recording medium that has a recording layer, said information processor comprising:

a substrate electrode in the recording medium, on which the recording layer is formed, the recording layer having a maximum difference in surface level of a 1×1 μm surface region of 1 nm or less;

at least one probe electrode disposed near the recording medium and having a tip, the tip of said at least one probe electrode having a radius of curvature in the range of 0.1 μm or greater;

at least one of (i) a circuit for applying an information recording pulse voltage between said at least one probe electrode and the recording medium to effect information recording on the recording medium, and (ii) a circuit for applying an information reproducing bias voltage between said at least one probe electrode and the recording medium to effect information reproducing from the recording medium; and means for controlling the distance between a surface of the recording medium and the tip of said at least one probe electrode.

2. An information processor according to claim 1, wherein said substrate electrode comprises an insulating substrate and a gold crystal in the form of a flat plate formed on the insulating substrate.

3. An information processor according to claim 1, wherein said substrate electrode comprises a conductive substrate and a gold crystal in the form of a flat plate formed on the conductive substrate.

4. An information processor according to claim 1, wherein the recording medium comprises a medium having an electric memory effect.

5. An information processor according to claim 1, wherein the recording layer comprises one of a monomolecular film and a monomolecular built-up film of an organic compound.

6. An information processor according to claim 1, wherein the recording layer has a thickness within the range of 5 to 300 Å.

7. An information processor according to claim 1, wherein the recording medium comprises material capable of repeating recording and erasing of information.

8. An information processor according to claim 1, comprising a plurality of said probe electrodes.

9. An information processor according to claim 2, comprising a plurality of said probe electrodes.

10. An information processor according to claim 3, comprising a plurality of said probe electrodes.

11. An information processor according to claim 4, comprising a plurality of said probe electrodes.

12. An information processor according to claim 5, comprising a plurality of said probe electrodes.

13. An information processor according to claim 6, comprising a plurality of said probe electrodes.

14. An information processor according to claim 7, comprising a plurality of said probe electrodes.

15. An information processing method comprising the steps of:

providing an information processor as recited in claim 1;

providing a recording medium; and performing at least one of recording information on the medium, reproducing information from the medium and repeatedly recording and erasing information on the medium using the information processor.

16. An information processing method comprising the steps of:

providing an information processor as recited in claim 2;

providing a recording medium; and performing at least one of recording information on the medium, reproducing information from the medium and repeatedly recording and erasing information on the medium using the information processor.

17. An information processing method comprising the steps of:

providing an information processor as recited in claim 3;

providing a recording medium; and performing at least one of recording information on the medium, reproducing information from the medium and repeatedly recording and erasing information on the medium using the information processor.

18. An information processing method comprising the steps of:

providing an information processor as recited in claim 4;

providing a recording medium; and performing at least one of recording information on the medium, reproducing information from the medium and repeatedly recording and erasing information on the medium using the information processor.

19. An information processing method comprising the steps of:

providing an information processor as recited in claim 5;

providing a recording medium; and performing at least one of recording information on the medium, reproducing information from the medium and repeatedly recording and erasing information on the medium using the information processor.

20. An information processing method comprising the steps of:

providing an information processor as recited in claim 6;

providing a recording medium; and performing at least one of recording information on the medium, reproducing information from the medium and repeatedly recording and erasing information on the medium using the information processor.

21. An information processing method comprising the steps of:

providing an information processor as recited in claim 7;

providing a recording medium; and performing at least one of recording information on the medium, reproducing information from the medium and repeatedly recording and erasing information on the medium using the information processor.

22. An information processing method comprising the steps of:

providing an information processor as recited in claim 8;

providing a recording medium; and performing at least one of recording information on the medium, reproducing information from the medium and repeatedly recording and erasing information on the medium using the information processor.

23. An information processing method comprising the steps of:

providing an information processor as recited in claim 9;

providing a recording medium; and performing at least one of recording information on the medium, reproducing information from the medium and repeatedly recording and erasing information on the medium using the information processor.

24. An information processing method comprising the steps of:

providing an information processor as recited in claim 10;

providing a recording medium; and performing at least one of recording information on the medium, reproducing information from the medium and repeatedly recording and erasing information on the medium using the information processor.

25. An information processing method comprising the steps of:

providing an information processor as recited in claim 11;

providing a recording medium; and performing at least one of recording information on the medium, reproducing information from the medium and repeatedly recording and erasing information on the medium using the information processor.

26. An information processing method comprising the steps of:

providing an information processor as recited in claim 12;

providing a recording medium; and performing at least one of recording information on the medium, reproducing information from the medium and repeatedly recording and erasing information on the medium using the information processor.

27. An information processing method comprising the steps of:

providing an information processor as recited in claim 13;

providing a recording medium; and performing at least one of recording information on the medium, reproducing information from the medium and repeatedly recording and erasing information on the medium using the information processor.

28. An information processing method comprising the steps of:

providing an information processor as recited in claim 14;

providing a recording medium; and performing at least one of recording information on the medium, reproducing information from the medium and repeatedly recording and erasing information on the medium using the information processor.

* * * * *

UNITED STATES PATENT AND TRADEMARK OFFICE
CERTIFICATE OF CORRECTION

PATENT NO. : 5,481,528
DATED : January 2, 1996
INVENTOR(S) : Ken EGUCHI, et al.

It is certified that error appears in the above-indentified patent and that said Letters Patent is hereby corrected as shown below:

On the title page, item [56]:

Under "OTHER PUBLICATIONS", Column 2, line 1, "pp. 120" should read --pp. 420--.

COLUMN 5:

Line 42, "0 942°," should read --0.924°,--.

COLUMN 7:

Line 65, "of tip" should read --of the tip--.

Signed and Sealed this

Eighteenth Day of June, 1996

*Attest:*

BRUCE LEHMAN

*Attesting Officer*      *Commissioner of Patents and Trademarks*